United States Patent
Armbruster

(10) Patent No.: US 12,515,386 B2
(45) Date of Patent: Jan. 6, 2026

(54) METHOD AND DEVICE FOR MAKING A MULTI COMPONENT PRODUCT

(71) Applicant: FOBOHA (Germany) GmbH, Haslach (DE)

(72) Inventor: Rainer Armbruster, Wolfach (DE)

(73) Assignee: FOBOHA (GERMANY) GMBH, Haslach (DE)

( * ) Notice: Subject to any disclaimer, the term of this patent is extended or adjusted under 35 U.S.C. 154(b) by 211 days.

(21) Appl. No.: 18/172,818

(22) Filed: Feb. 22, 2023

(65) Prior Publication Data

US 2023/0191672 A1 Jun. 22, 2023

Related U.S. Application Data

(63) Continuation of application No. 16/302,216, filed as application No. PCT/EP2017/065756 on Jun. 27, 2017, now Pat. No. 11,597,128.

(30) Foreign Application Priority Data

Jun. 27, 2016 (CH) .................................. 00817/16

(51) Int. Cl.
*B29C 45/16* (2006.01)
*A61J 1/10* (2006.01)
(Continued)

(52) U.S. Cl.
CPC ............. *B29C 45/1628* (2013.01); *A61J 1/10* (2013.01); *B29C 45/1671* (2013.01);
(Continued)

(58) Field of Classification Search
CPC ................................................ B29C 45/1628
See application file for complete search history.

(56) References Cited

U.S. PATENT DOCUMENTS

| 4,444,711 A | 4/1984 | Schad |
|---|---|---|
| 7,608,212 B2 | 10/2009 | Gram |

(Continued)

FOREIGN PATENT DOCUMENTS

| CH | 705721 A2 | 5/2013 | |
|---|---|---|---|
| DE | 102008047564 A1 * | 3/2010 | ............. B29C 67/24 |

(Continued)

OTHER PUBLICATIONS

Machine translation CH705721A2 (Year: 2013).*

(Continued)

*Primary Examiner* — Jacob T Minskey
*Assistant Examiner* — Wayne K. Swier
(74) *Attorney, Agent, or Firm* — CANTOR COLBURN LLP

(57) ABSTRACT

An injection molding device with a middle mold part arranged in a first direction between first and second outer mold parts that are linearly movable with respect to the middle mold part in the first direction between open and closed positions. One or more side face regions of the middle mold part is configured to receive and hold in a lateral position a cavity module from outside of the injection mold during injection molding. A first cavity arranged in the cavity module at least in the closed position of the injection mold communicates with a first cavity half of a second cavity. At least one of the outer mold parts includes a second half of the second cavity, which interacts with the first half to form the second cavity to receive a liquefied plastic material and to form a second component interconnected to the first component.

20 Claims, 3 Drawing Sheets

(51) Int. Cl.
  *B29C 45/14* (2006.01)
  *B29C 45/26* (2006.01)
  *B29L 31/00* (2006.01)

(52) U.S. Cl.
  CPC .... *B29C 45/2673* (2013.01); *B29C 45/14336* (2013.01); *B29C 2045/1632* (2013.01); *B29L 2031/7128* (2013.01); *B29L 2031/7148* (2013.01)

(56) References Cited

U.S. PATENT DOCUMENTS

| | | |
|---|---|---|
| 2001/0033875 A1 | 10/2001 | Boucherie |
| 2005/0144034 A1* | 6/2005 | Hunter ............... B29C 45/0084 36/44 |
| 2006/0003172 A1* | 1/2006 | Scherer ............... B29C 45/1671 428/457 |
| 2009/0243148 A1 | 10/2009 | Gruber |
| 2010/0013152 A1 | 1/2010 | Grauzer et al. |
| 2010/0117440 A1* | 5/2010 | Ebner ................ B29C 45/0084 300/8 |
| 2011/0117233 A1 | 5/2011 | Boucherie |
| 2013/0302457 A1 | 11/2013 | Zahoransky |
| 2015/0190957 A1 | 7/2015 | Boucherie |

FOREIGN PATENT DOCUMENTS

| | | | | |
|---|---|---|---|---|
| EP | 1782936 A2 | * | 5/2007 | ......... B29C 45/1628 |
| JP | S63 135213 A | | 6/1988 | |

OTHER PUBLICATIONS

Polyhedron: Cue Learn Pvt. Ltd. 2020 https://www.cuemath.com/geometry/polyhedron/ (Year: 2020).*
Machine translation EP1782936A2 (Year: 2007).*
Machine translation DE102008047564A1 (Year: 2010).*
European Patent Office, International Search Report for PCT/EP2017/065756, Nov. 7, 2017, five (5), The Netherlands.
European Patent Office, International Searching Authority, Written Opinion of the International Searching Authority for PCT/EP2017/065756, Nov. 7, 2017, ten 10 pages, Munich, Germany.

* cited by examiner

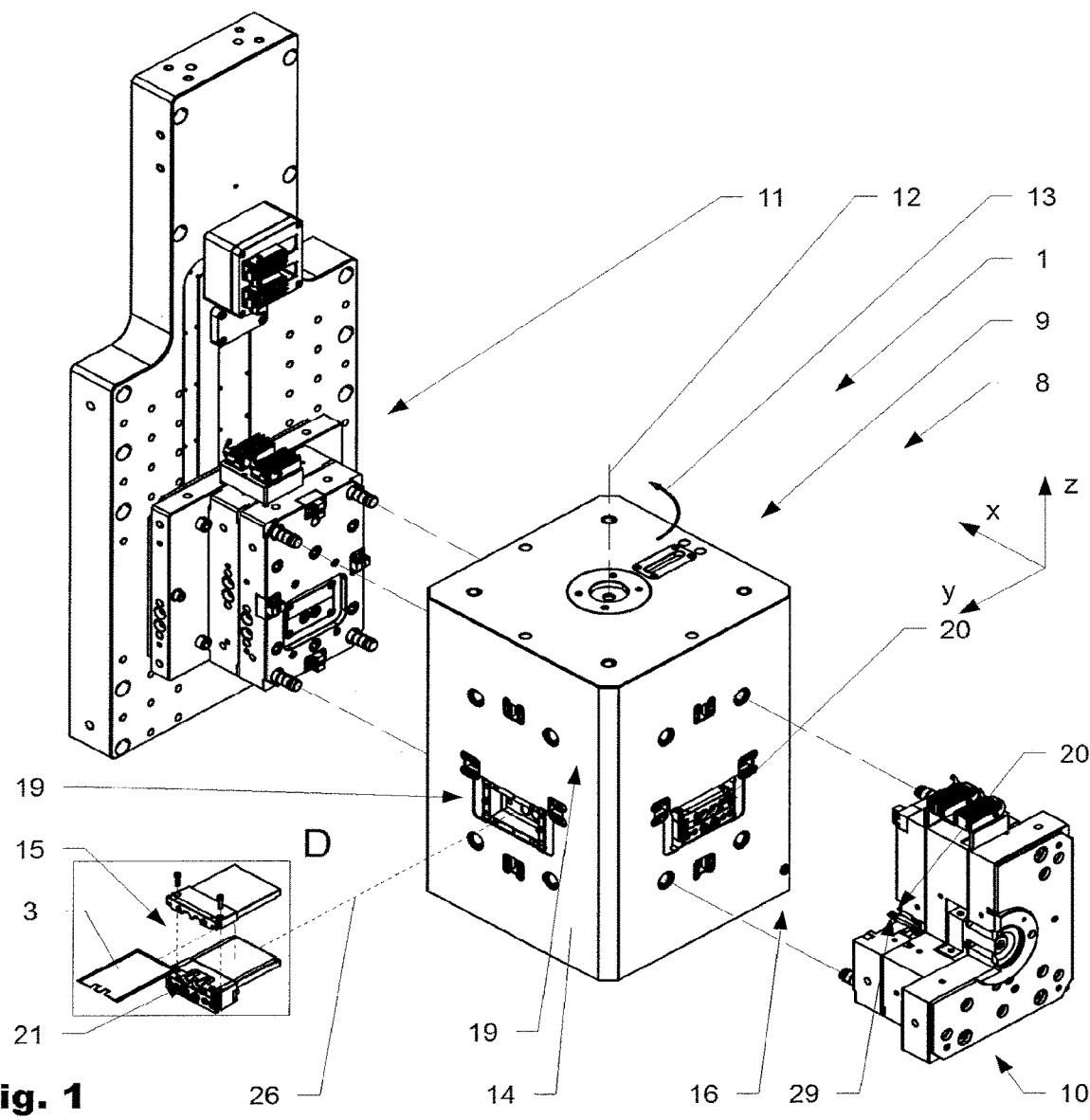
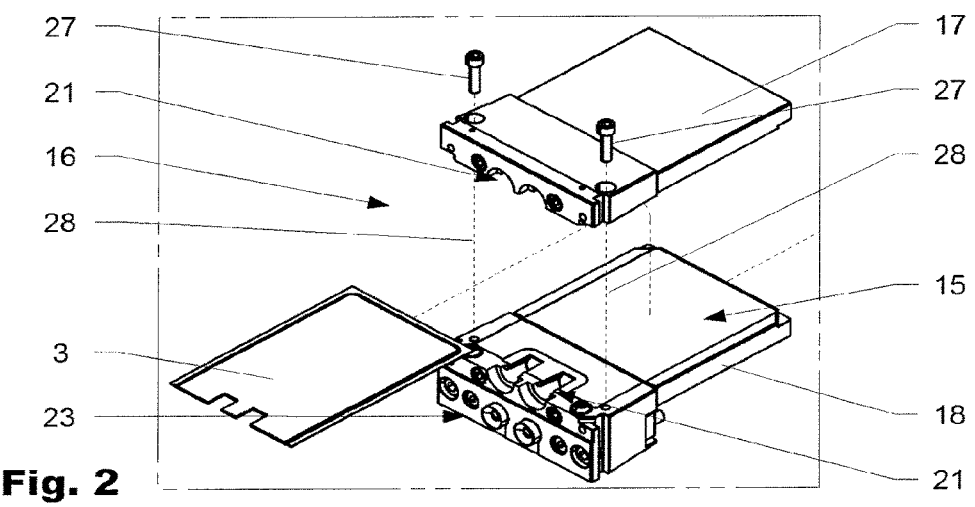
Fig. 1
Fig. 2

METHOD AND DEVICE FOR MAKING A MULTI COMPONENT PRODUCT

CROSS-REFERENCE TO RELATED APPLICATIONS

This application is a continuation of U.S. patent application Ser. No. 16/302,216, filed on Nov. 16, 2018, which is a U.S. national stage entry under 35 U.S.C. § 371 of PCT International Application No. PCT/EP2017/065756, filed on Jun. 27, 2017, and claims priority to Swiss Application No. 00817/16, filed on Jun. 27, 2016, the entire contents of each of which are incorporated herein by reference in their entirety.

FIELD OF THE INVENTION

The present invention relates to an injection molding device for the production of multi component injection molded products.

BACKGROUND OF THE INVENTION

From the prior art injection molding machines are known which are used to make multi component injection molded products.

US2010117440A was first published in 2009 in the name of Zahoransky A G. It describes a brush manufacturing machine which has a first injection-molding machine for the region-by-region injection molding of material around bristle bundles held in cartridges and for forming a bristle carrier connecting the bristle bundles. A second injection-molding machine is present in which the bristle carrier can be inserted and material can be injection molded around this carrier for forming a brush body or partial brush body. The first injection-molding machine is constructed for forming a thin-walled plate as a bristle carrier and has a shorter cycle time than the second injection-molding machine. At least the second injection-molding machine is constructed as a multi-compartment injection-molding machine and has a multiple of the number of mold cavities of the first injection-molding machine.

US2001013152 was first published in 2000 in the name of M and C Schiffer GmbH. It relates to a method of manufacturing a brush head comprising a brush head body carrying bristle bundles, such as tooth brushes, by way of injection molding. A first plastic component is injected into a first mold cavity for forming a bristle carrier. The ends of the bristle filaments projecting into the first mold cavity are encompassed by the first plastic component. The bristle carrier manufactured during the first step is relocated into another mold cavity, which is larger than the bristle carrier, and which is filled with a hard component. A brush head complying with the above-mentioned demands, that the brush body comprises a bristle carrier encompassing the bristle filaments on the attachment side, said bristle carrier being embedded into a hard component.

SUMMARY OF THE INVENTION

The injection molding devices known from the prior art are relatively complex and slow. It is an object of the invention to provide a more efficient and precise device for the making of multi component injection molded products.

The invention is therefore directed to injection molding devices for the efficient production of complex multi component injection molded products, such as e.g. blood bags, beverages bags for drinks or other liquids and similar products comprising two or more components.

Products such as e.g. blood bags normally comprise a bag (first component), a spout (second component) and a seal (third component) which are interconnected to each other. While the spout is attached to the bag, the seal is normally made from a different material then the spout. In a preferred embodiment the seal is attached to a plug which is interconnected to the spout by a film hinge (thin stripe of material). The spout and the plug are preferably made from the same material (second component).

Products such as e.g. toothbrushes may comprise brushes (first component), a carrier for the brushes (second component) and a brush body (third component) which are interconnected to each other. While the carrier is attached to the brushes, the brush body is attached to the carrier.

Products such as e.g. golf balls normally comprise a core (first component), an inner layer (second component) and an outer layer (third component). While the inner layer encompasses the core, the outer layer encompasses the inner layer.

An injection molding device according to the invention normally comprises an injection machine and an injection mold with a middle mold part which is arranged in a first direction between a first outer mold part and a second outer mold part. The first outer mold part and the second outer mold part are arranged linear movable with respect to the middle mold part in the first direction between an open position and a closed position of the injection mold. The middle mold part is arranged turnable about a rotation axis and comprises at least one side face.

In an operable condition the at least one side face comprises at least one first cavity suitable to temporarily receive a first component. The first cavity communicates at least in the closed position of the mold with a first cavity half of a second cavity. At least one of the outer mold parts comprises a second cavity half of the second cavity which in a closed position of the injection mold interacts with the first cavity half to form the second cavity suitable to receive a liquefied first plastic material to form a second component interconnected to the first component of the multi component injection molded product.

In a variation the at least one first cavity is at least partially arranged between a first side plate and a second side plate of a cavity module which is separable from the middle mold part. The middle mold part comprises at least one recess foreseen to receive the at least one cavity module during production. During production a number of the cavity modules can be arranged outside of the middle mold part. The number of cavity modules can be higher than the number of recesses in the middle mold part. A first cavity half of the second cavity can at least partially be arranged in a side plate of a cavity module and in a closed position communicates with the first cavity.

In a variation at least one side plate of the cavity module is interconnected to the middle mold part while the second side plate is arranged movable with respect to the first side plate between an open and a closed position. E.g. the second side plate is arranged rotatable about a hinge axis and/or in a translational manner with respect to the first side plate of the related cavity module.

A handling system can be interconnected to the injection mold to handle at least the first components and/or the final multi component injection molded products. The handling system can be used to insert and/or remove the first component from the first cavity when the cavity is in an open position. The handling system can comprise means to open and/or close the first cavity of the cavity module. Alternatively or in addition these means can be incorporated in the middle mold part. In a preferred variation the handling system interacts with a side face of the middle mold part arranged at an angle of 90° with respect to the side faces under production, i.e. those which are interacting with the outer mold parts for injection molding.

If appropriate, a third component which is interconnected to the second component can be made as follows: A first cavity half of a third cavity is arranged adjacent to the first cavity half of the second cavity and interacts in a closed position of the injection mold with a second cavity half of the third cavity arranged in the second outer mold part. The third cavity is foreseen to receive a liquefied second plastic material to form the third component of the multi component injection molded product. The third cavity can at least partially be integrated into the cavity module and/or the side face of the middle mold part in which the cavity module is arranged.

If appropriate, the first and/or the second mold half may comprise additional cutting means to trim the first component.

A method for the production of a multi component injection molded product according to the invention may comprise the following method steps:
a) Providing an injection molding device as described above and hereinafter;
b) Closing the injection molding device such that the third cavity is closed;
c) Injecting the liquefied second plastic material into the third cavity to form the third component (at 0° position of the middle mold part);
d) Rotating the middle mold part by 90° along with the third component attached to the middle mold part into a 90° position of the middle mold part;
e) Inserting a first component in the first cavity, respectively inserting a cavity module comprising a first component in the first cavity into a respective recess of the middle mold part;
f) Rotating the middle mold part by 90° into 180° position along with the third component attached to the middle mold part until the third component is arranged adjacent to the second cavity;
g) Closing the injection molding device such that the second cavity is closed;
h) Injecting liquefied first plastic material into the second cavity to form the second component interconnected to the first and the third component;
i) Opening the injection molding device after the first plastic material of the secand component is sufficiently cured;
j) Opening the injection molding device and removing the multi component injection molded product.

Normally the injection of the liquefied first plastic material into the second cavity and the liquefied second plastic material into the third cavity takes place simultaneously, i.e. when the injection mold is closed.

It is to be understood that both the foregoing general description and the following detailed description present embodiments, and are intended to provide an overview or framework for understanding the nature and character of the disclosure. The accompanying drawings are included to pro-vide a further understanding, and are incorporated into and constitute a part of this specification. The drawings illustrate various variations of the invention, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing:
FIG. 1 an injection molding device in a perspective manner;
FIG. 2 detail D of FIG. 1.

DESCRIPTION OF THE VARIATIONS

Reference will now be made in detail to certain variations, examples of which are illustrated in the accompanying drawings, in which some, but not all features are shown. Indeed, the variation disclosed herein may be embodied in many different forms and should not be construed as limited to the variations set forth herein; rather, these variations are provided so that this disclosure will satisfy applicable legal requirements. Whenever possible, like reference numbers will be used to refer to like components or parts.

FIG. 1 shows an injection molding device 1 according to one variation of the invention. The shown example of the injection molding device 1 is suitable for the efficient production of multi component injection molded products such as blood bags 2.

Figure 6:
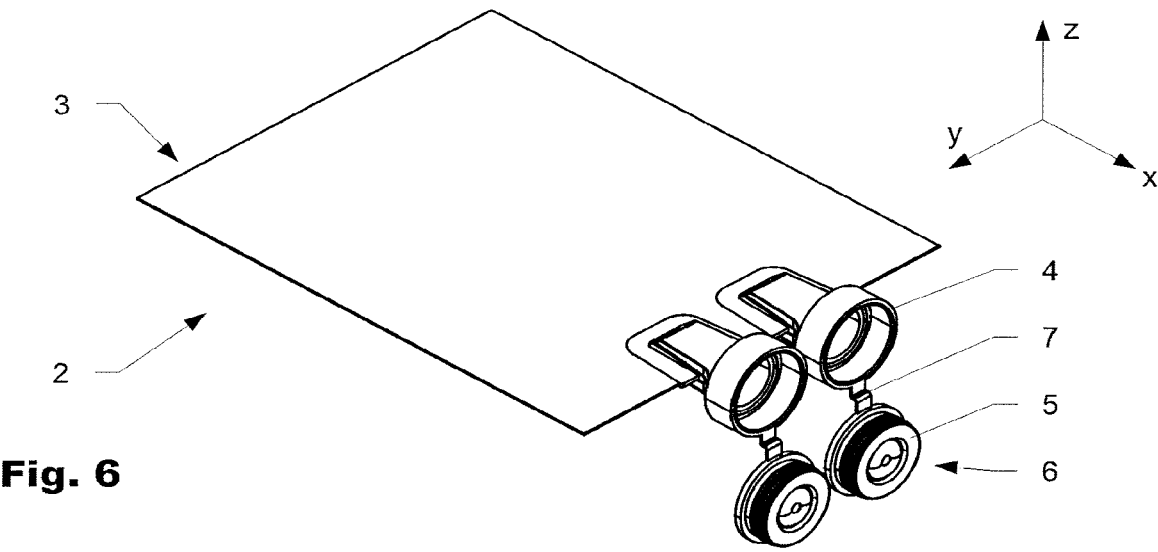
FIG. 6 a third component (seal)

As shown in FIG. 6, a blood bag 2 normally comprise a bag body 3 (first component), a spout 4 (second component) and a seal 5 (third component) which are interconnected to each other. While the spout 4 is attached to the bag body 3, the seal 5 is normally made from a different material then the spout 4. In a preferred variation the seal 5 is attached to a plug 6 which is interconnected to the spout by a film hinge 7, e.g. in the form of a thin stripe of material. The spout 4 and the plug 6 are preferably made from the same material (second component). Alternatively the seal 5 and the plug 6 can be made from the same material.

As visible in FIG. 1 and FIG. 2 the injection molding device 1 comprises an injection mold 8 with a middle mold part 9 which is arranged in a first direction (x-direction) between a first outer mold part 10 and a second outer mold part 11. The first outer mold part 10 and the second outer mold part 11 are arranged linear movable with respect to the middle mold part 9 in the first direction (x) between an open position and a closed position of the injection mold 8. The middle mold part 9 is arranged turnable about a rotation axis 12 (z-direction) in a clockwise direction as indicated by arrow 13 and comprises in the shown variation four side faces 14 which are arranged parallel to each other in pairs.

Figure 4:
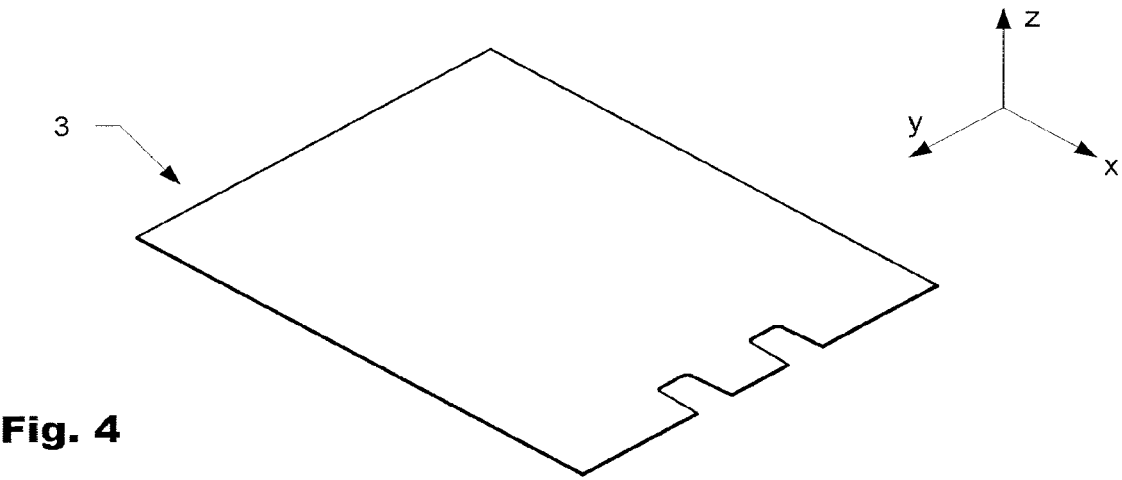
FIG. 4 a first component (bag body)

In an operable condition, the at least one side face 14 comprises at least one first cavity 15 suitable to temporarily receive a first component 3, here in the form of a bag body made out of thin a thin foil of plastic material (compare FIG. 4). The bag body 3 may comprise several layers, depending on the field of application. The first component 3 is inserted into the first cavity 15, preferably by a handling system which forms part of the injection molding device 1 or which is arranged on the outside.

Figure 7:
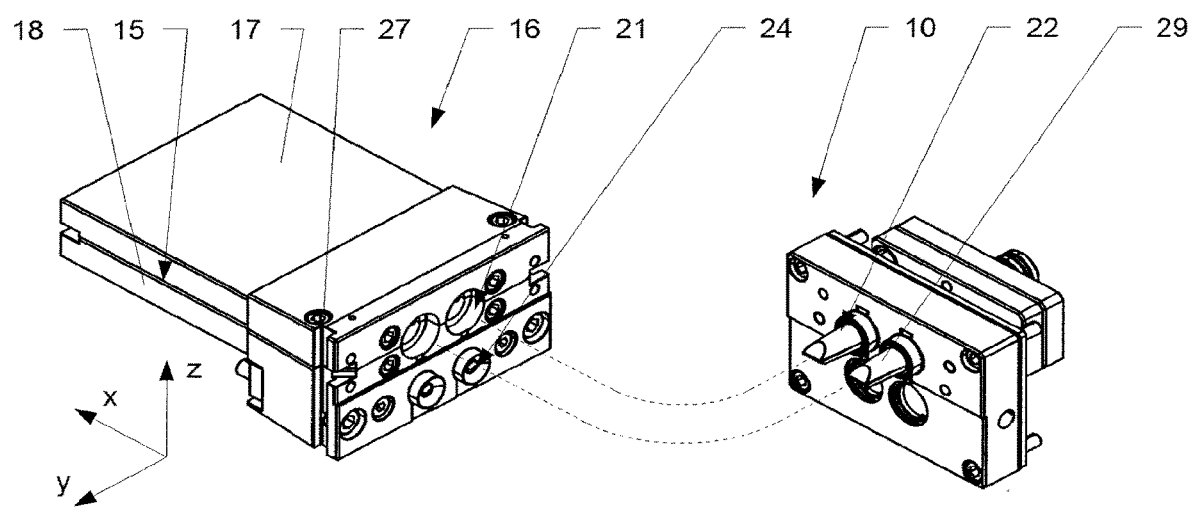
FIG. 7 a cavity module with parts of the middle mold part in a perspective manner.
Figure 5:
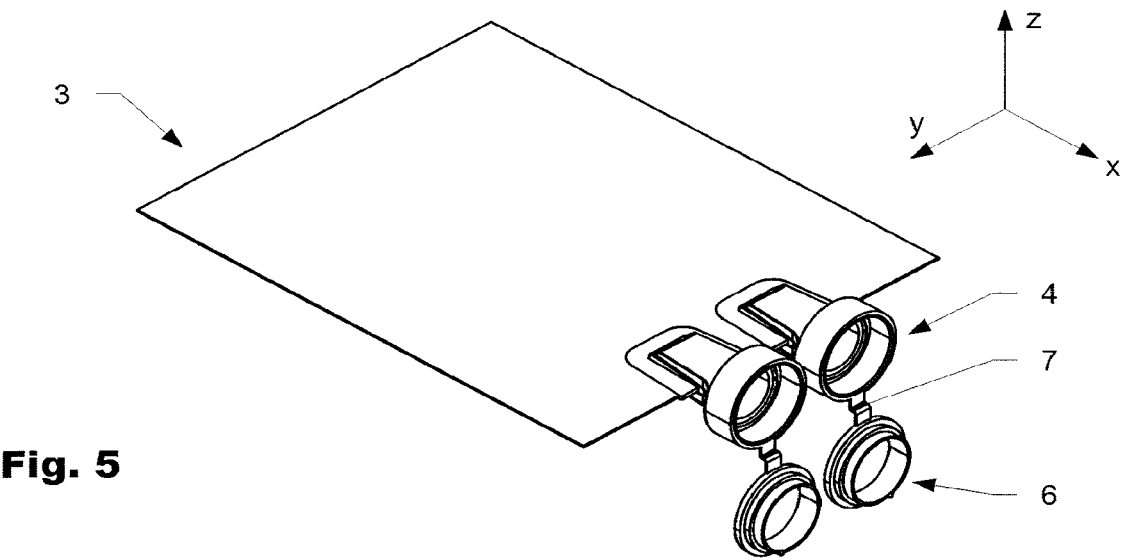
FIG. 5 a second component (spout)

The first cavity 15 communicates at least in the closed position of the injection mold (not shown in detail) with a first cavity half 21 of a second cavity 20. At least one of the outer mold part 10 comprises a second cavity half 22 of the second cavity which in a closed position of the injection mold 8 interacts with the first cavity half 21 to form the second cavity 20, as indicated by the dotted line FIG. 7. The second cavity 20 is suitable to receive a liquefied first plastic material to form the second component 4 interconnected to the first component 3 of the multi component injection molded product 2 (compare FIG. 5).

The middle mold part 9 comprises at least one recess 19 foreseen to receive the at least one cavity module 16 during production. A cavity module is inserted into the recess from the outside as schematically indicated by dotted line 26 in FIG. 1. The direction of insert is in the shown variation perpendicular to the side face 14. If appropriate one or several recesses 19 can be arrange in at least one row and/or column in each side face 14 (not shown in detail).

Figure 3:
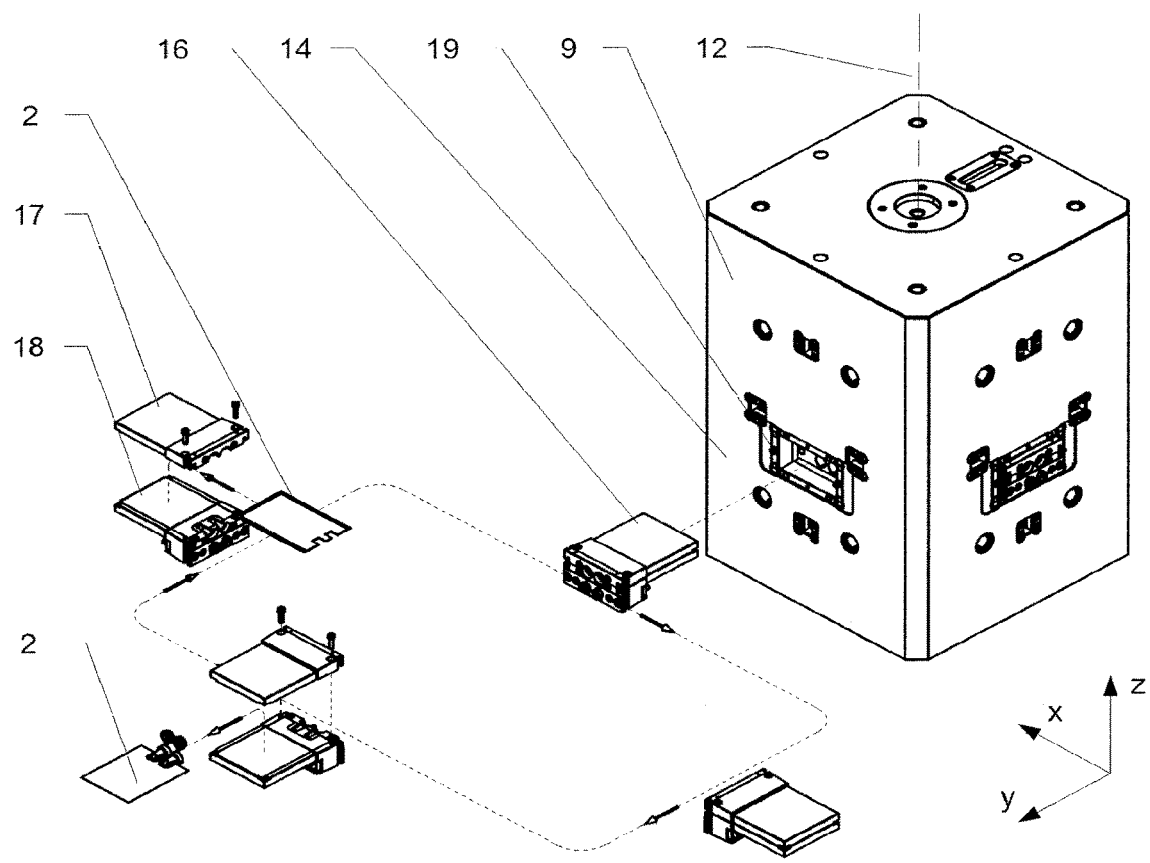
FIG. 3 a middle mold part along with a cavity module in a perspective manner.

FIG. 3 is schematically showing the handling of the cavity modules 16. As shown, a number of the cavity modules 16 are arranged outside of the middle mold part 9 during production. The number of cavity modules can be higher than the number of recesses in the middle mold part 9. A first cavity half 21 of the second cavity 20 can at least partially be arranged in a side plate of a cavity module 16 and in a closed position communicates with the first cavity 15.

The third component 5 which corresponds in the herein described example the seal 5, is made as follows. A first cavity half 24 of a third cavity 23 is arranged adjacent to the first cavity half 21 of the second cavity 20 and interacts in a closed position of the injection mold 9 with a second cavity half 25 of the third cavity 23 arranged in the second outer mold part 11. The third cavity 23 is foreseen to receive a liquefied second plastic material to form the third component 5 of the multi component injection molded product 2 (compare FIG. 6). The third cavity 23 can at least partially be integrated into the cavity module 16 and/or the side face 14 of the middle mold part 9 in which the cavity module 16 is arranged during production.

As best visible in FIG. 2, a first cavity 15 is arranged between a first side plate 17 and a second side plate 18 of a cavity module 16 which is separable from the middle mold part 9 in a radial direction (depending on the field of application, other directions are possible). The first and the second side plate 17, 18 may be e.g. interconnectable to each other by bolts 27 and/or a snap connection and/or a magnetic connection if appropriate. The assembly direction is schematically indicated by dotted lines 28. When the first and the second side plate 17, 18 are separated from each other the first component 3 is arranged between the first and the second side plate 17, 18 and the cavity module 16 is closed again. The cavity module 16 is then inserted into recess 19 in the side face 14. It is securely held therein by appropriate locking means not shown in detail.

The following steps are executed for the production of the multi component injection molded product 2 as described above: Inserting a cavity module 16 comprising a first component 3 into a recess 19 of the middle mold part 9. Rotating the middle mold part 9 by 90° into 180°-position. Closing the injection mold 8 such that the second cavity 20 is closed. Injecting of the liquefied first plastic material into the second cavity 20 to form the second component 4 interconnected to the first component 3. Opening the injection mold 8 after the first plastic material of the second component 4 is sufficiently cured. Rotating the middle mold part 9 by 180° and closing the injection mold 8 such that the second component 4 is enclosed in the third cavity 23. Injecting the liquefied second plastic material into the third cavity 23 to form the third component 5 (at 0° position of the middle mold part). Rotating the middle mold part 9 by 90° and removing the cavity module 16 with the final product 2. Removing the final product 2 from the cavity module 16 and starting the process again. Injection of the liquefied plastic materials takes place via the first and the second outer mold parts 10, 11. Normally the injection of the liquefied first plastic material into the second cavity 20 and the liquefied second plastic material into the third cavity 23 takes place simultaneously, i.e. when the injection mold 8 is closed.

As schematically indicated in FIG. 3, a handling system can be interconnected to the injection mold to handle at least the first components and/or the final multi component injection molded products. The handling system can be used to insert and/or remove the first component 3 from the first cavity 15 when the cavity module 16 is in an open position. The handling system can comprise means to open and/or close the first cavity 15 of the cavity module 16. Alternatively or in addition, these means can be incorporated in the middle mold part 8. In a preferred variation the handling system interacts with a side face 14 of the middle mold part 8 arranged at an angle of 90° with respect to the side faces 14 under production, i.e. those which are interacting with the outer mold parts 10, 11 for injection molding.

Rather, the words used in the specification are words of description rather than limitation, and it is understood that various changes may be made without departing from the spirit and scope of the invention.

LIST OF DESIGNATIONS x First direction
1 Injection molding device
2 Multi component injection molded product/blood bag
3 First component/bag body (bag)
4 Second component/spout (bag)
5 Third component/seal (bag)
6 Plug
7 Film hinge
8 Injection mold
9 Middle mold part
10 First outer mold part
11 Second outer mold part
12 Rotation axis
13 Turning direction (arrow)
14 Side face (middle mold part)
15 First cavity
16 Cavity module
17 First side plate (first cavity module)
18 Second side plate (first cavity module)
19 Recess (for first cavity module)
20 Second cavity
21 First cavity half (second cavity)
22 Second cavity half (second cavity)
23 Third cavity
24 First cavity half (third cavity)
25 Second cavity half (third cavity)
26 Direction of insert (line)
27 Bolt (cavity module)
28 Direction of assembly (line)
29 Cutting means

What is claimed is:

1. An injection molding device to produce multi component injection molded products, comprising:
    an injection mold with a middle mold part arranged in a first direction between a first outer mold part and a second outer mold part,
    wherein the first outer mold part and the second outer mold part are arranged to be linearly movable with respect to the middle mold part in the first direction between an open position and a closed position of the injection mold,
    wherein the middle mold part is substantially polyhedral shaped and includes a plurality of side face regions, one or more of the side face regions being defined by an access point into a corresponding recess inside the middle mold part,
    wherein the middle mold part is arranged turnable about a rotation axis, the rotation axis arranged perpendicular to the first direction in a vertical direction and substantially parallel to the plurality of side face regions,
    wherein at least two of the plurality of side face regions are configured to receive from a lateral direction a cavity module from the outside of the injection mold and to hold said cavity module during injection molding, said lateral direction being at an angle of about 90° with respect to the plurality of side face regions during injection molding,
    wherein after at least a partial rotation of the middle mold part around the rotation axis, the cavity module is separable from the respective side face region,
    wherein the cavity module includes a first cavity that is at least partially arranged between a first side plate and a second side plate,
    wherein the cavity module is suitable to temporarily receive a first component,
    wherein the first side plate and the second side plate of the cavity module are arranged to be movable with respect to each other between an open position of the cavity module and a closed position of the cavity module,
    wherein the cavity module is arranged to be separable from the middle mold part in the closed position of the cavity module,
    wherein the first cavity at least in the closed position of the injection mold communicates with a first cavity half of a second cavity, and
    wherein at least one of the first and second outer mold parts includes a second cavity half of the second cavity, which in a closed position of the injection mold interacts with the first cavity half to form the second cavity suitable to receive a liquefied first plastic material and further suitable to form a second component interconnected to the first component of the multi component injection molded product.

2. The injection molding device according to claim 1, wherein the second side plate is arranged to be rotatable about a hinge axis and/or arranged in a translational manner with respect to the first side plate of the cavity module.

3. The injection molding device according to claim 1, wherein the second side plate is arranged rotatable about a hinge axis with respect to the first side plate of the cavity module from the closed position of the cavity module into the open position of the cavity module against a force of a spring.

4. The injection molding device according to claim 3, further comprising:
    a handling system arranged to open and/or close the first cavity of the cavity module and further arranged to insert the first component into the first cavity in the open position of the cavity module.

5. The injection molding device according to claim 1, wherein an inner contour of the first cavity corresponds at least partially to an outer shape of the first component, the first component being an external component.

6. The injection molding device according to claim 1, further comprising:
    a third cavity, wherein a first cavity half of the third cavity is arranged adjacent to the first cavity half of the second cavity, wherein the first cavity half of the third cavity interacts in a closed position of the injection mold with a second cavity half of the third cavity arranged in the second outer mold part, and wherein the third cavity is arranged to receive a liquefied second plastic material to form a third component of the multi component injection molded product.

7. The injection molding device according to claim 6, wherein the third cavity is at least partially integrated into the cavity module and/or at least one side face region of the middle mold part in which the cavity module is arranged.

8. The injection molding device according to claim 1, wherein the first side plate and the second side plate of the cavity module are configured to carry the first component at least partially clamped therebetween.

9. The injection molding device according to claim 1, wherein the first component extends in the closed position of the injection mold from the first cavity into the second cavity, such that the first component is at least partially encompassed by the liquefied first plastic material when the liquefied first plastic material is received in the second cavity during injection molding.

10. The injection molding device according to claim 1, wherein the first cavity of the cavity module is suitable to temporarily receive a first component formed as a razor blade.

11. The injection molding device according to claim 1, wherein the cavity module includes a plurality of first cavities each suitable to temporarily receive a first component.

12. The injection molding device according to claim 1, further comprising:
    a handling system, wherein during injection molding, the cavity module is:
    arrangeable at a side face region of the middle mold part by the handling system in a detachable manner when the cavity module is carrying the first component at least partially clamped between the first side plate and the second side plate; and/or
    detachable by the handling system from a selected side face region of the middle mold part, wherein the cavity module is carrying the multi component injection molded product with the first component at least partially clamped between the first side plate and the second side plate.

13. The injection molding device according to claim 1, wherein the cavity module is one of a plurality of cavity modules, and wherein during injection molding, the plurality of cavity modules are arranged outside of the injection mold.

14. The injection molding device according to claim 13, wherein the plurality of cavity modules includes more cavity modules than are arranged at the middle mold part during injection molding.

15. The injection molding device according to claim 1, wherein the first cavity half of the second cavity is at least partially arranged at a selected side plate of the cavity module and when the first outer mold part and the second outer mold are in the closed position, the first cavity half of the second cavity communicates with the first cavity.

16. A method to produce a multi component injection molded product, comprising:
providing an injection molding device having an injection mold, the injection mold having a middle mold part arranged in a first direction between a first outer mold part and a second outer mold part, the middle mold part having a substantially polyhedral shape and a plurality of side face regions, one or more of the side face regions being defined by an access point into a corresponding recess inside the middle mold part;
opening a cavity module;
temporarily positioning a first component in a first cavity of the open cavity module, the first cavity being at least partially arranged between a first side plate and a second side plate, wherein the first side plate and the second side plate of the cavity module are movable with respect to each other between an open position of the cavity module and a closed position of the cavity module, and wherein the cavity module is arranged to be joinable to and separable from the middle mold part in the closed position of the cavity module;
closing the cavity module;
closing the injection mold by linearly moving the first outer mold part and the second outer mold part with respect to the middle mold part in the first direction between an open position and a closed position of the injection mold;
via the injection mold being in the closed position, forming a second cavity, wherein one or more parts of the second cavity are arranged in one or more of the first and second outer mold parts;
receiving the closed cavity module into the middle mold part from outside of the injection mold and from a lateral direction through the respective access point of at least one side face region, said lateral direction being at an angle of about 90° with respect to the plurality of side face regions during injection molding;
injecting liquefied first plastic material into the second cavity to form a second component interconnected to the first component of the multi component injection molded product, wherein the first cavity at least in the closed position of the injection mold communicates with at least one part of the second cavity;
opening the injection molding device after the first plastic material is sufficiently cured;
rotating, at least partially, the middle mold part about a rotation axis that is arranged perpendicular to the first direction in a vertical direction and substantially parallel to the plurality of side face regions wherein after the at least partial rotation of the middle mold part around the rotation axis, the cavity module is separable from the respective side face region;
closing the injection mold;
injecting liquefied second plastic material into a third cavity to form a third component of the multi component injection molded product;
opening the injection mold; and
removing the multi component injection molded product.

17. The method according to claim 16, further comprising:
displacing by a handling system that is external to the injection mold the first side plate and the second side plate of at least one cavity module with respect to each other from the closed to the open position of the at least one cavity module; and
after positioning the first component in the first cavity, displacing the first side plate and the second side plate of at the least one cavity module with respect to each other from the open to the closed position of the at least one cavity module.

18. The method according to claim 16, further comprising:
attaching by a handling system the cavity module carrying at least one first component at a selected side face region of the middle mold part from a lateral direction, said lateral direction being at an angle of about 90° with respect to the selected side face region during injection molding; and
detaching by the handling system after at least the partial rotation of the middle mold part around the rotation axis the cavity module carrying the multi component injection molded product.

19. The method according to claim 18, wherein opening the cavity module, temporarily positioning the first component, and closing the cavity module includes at least partially clamping the first component between the first and the second side plates.

20. An injection molding system to produce a multi component injection molded product, comprising:
an injection molding device having a first outer mold part and a second outer mold part arranged to linearly move in a first direction with respect to each other between an open position and a closed position;
an injection mold arranged in the first direction between the first and the second outer mold parts of the injection molding device, the injection mold having a middle mold part with a substantially polyhedral shape and a plurality of side face regions, one or more of the side face regions being defined by an access point into a corresponding recess inside the middle mold part, the middle mold part further arranged to rotate, at least partially, about a rotation axis that is arranged perpendicular to the first direction in a vertical direction and substantially parallel to the plurality of side face regions;
a plurality of cavity modules, each cavity module having one or more first cavities, each first cavity being at least partially arranged between a first side plate of the cavity module and a second side plate of the cavity module, wherein the first and second side plates of the cavity module are movable with respect to each other between an open position of the cavity module and a closed position of the cavity module, wherein each first cavity is arranged to temporarily receive a first component of a multi component injection molded product when the cavity module is in the open position;
a second cavity formed when the injection molding device is in the closed position, the second cavity having one or more parts arranged in one or more of the first and second outer mold parts, wherein at least one part of the second cavity is arranged to communicate with at least one first cavity during injection molding;
a handling system arranged to handle the plurality of cavity modules during injection molding, wherein handling the plurality of cavity modules includes advancing a closed cavity module in a lateral direction through the respective access point of at least one side face region after at least a partial rotation of the middle mold part around the rotation axis, said lateral direction being at an angle of about 90° with respect to the plurality of side face regions; and at least one injection molding fluid source arranged to provide a liquefied first plastic material into the second cavity during injection molding to form a second component interconnected to a respective first component of a respective multi component injection molded product.

* * * * *